Patented Aug. 7, 1923.

1,464,170

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing. Application filed April 5, 1921, Serial No. 458,741. Renewed February 2, 1923.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers from thin solutions in acetic esters of lower monohydroxy aliphatic alcohols or in ethylene chloride, it has been found that such single solvents by themselves will not dissolve a sufficient proportion of the ethers to make a desirably thick flowable composition or dope, such as may be used in the manufacture of photographic film base by the customary methods, and in the other plastic arts.

I have discovered that an adequately strong and useful solvent may be prepared by mixing ethylene chloride with an acetic ester of a lower monohydroxy aliphatic alcohol. By a lower monohydroxy aliphatic alcohol, I mean one having less than 6 carbon atoms. While the proportions in which the ingredients may be mixed can be varied considerably, the following examples illustrate useful ranges. I may, for example, mix 40 to 50 parts by weight of ethylene chloride with 60 to 50 parts of methyl acetate, or I may use 60 to 50 parts of ethyl acetate in place of the methyl acetate. While the amounts of ethers which may be dissolved in my compound solvents can vary widely, it is noted, by way of illustration, that a useful viscous flowable solution can be obtained by dissolving one part of water-insoluble ethyl cellulose in 5 parts of one of the above mentioned compound solvents. Other substances which impart additional suppleness, or incombustibility, or other qualities, to the film may then be added to the dope, such, for instance, as triphenyl or tricresyl phosphate, camphor, etc.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A compound solvent for ethers of cellulose, comprising a mixture of ethylene chloride and an acetic ester of a lower monohydroxy aliphatic alcohol.

2. A compound solvent for alkyl ethers of cellulose, comprising from 40 to 50 parts by weight of ethylene chloride and 60 to 50 parts of an acetic ester of a lower monohydroxy aliphatic alcohol.

3. A compound solvent for alkyl ethers of cellulose, comprising a mixture of ethylene chloride and methyl acetate.

4. A viscous flowable film-forming composition, comprising an ether of cellulose dissolved in a mixture of ethylene chloride and an acetic ester of a monohydroxy aliphatic alcohol.

5. A viscous flowable film-forming composition, comprising an alkyl ether of cellulose dissolved in a compound solvent containing from 40 to 50 parts by weight of ethylene chloride and 60 to 50 parts by weight of an acetic ester of a lower monohydroxy aliphatic alcohol.

6. A composition of matter, comprising 1 part of water-insoluble ethyl cellulose dissolved in approximately 5 parts by weight of a compound solvent containing ethylene chloride and methyl acetate.

Signed at Rochester, New York, this 30th day of March 1921.

STEWART J. CARROLL.